United States Patent
Heisch

(10) Patent No.: US 6,820,176 B2
(45) Date of Patent: Nov. 16, 2004

(54) SYSTEM, METHOD, AND COMPUTER PROGRAM PRODUCT FOR REDUCING OVERHEAD ASSOCIATED WITH SOFTWARE LOCK MONITORING

(75) Inventor: Randall Ray Heisch, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 10/138,900

(22) Filed: May 2, 2002

(65) Prior Publication Data

US 2003/0208662 A1 Nov. 6, 2003

(51) Int. Cl.[7] .............................................. G06F 12/14
(52) U.S. Cl. ..................................... 711/152; 711/163
(58) Field of Search ......................... 711/147, 150–152, 711/163

(56) References Cited

U.S. PATENT DOCUMENTS 6,093,213 A * 7/2000 Favor et al. .................. 703/27
6,530,079 B1 * 3/2003 Choi et al. ................... 717/158

OTHER PUBLICATIONS

Joint International Conference on Measurement and Modeling of Computer Systems, Proceedings of the 1999 ACM SIGMETRICS international conference on Measurement and modeling of computer systems. 1999, Atlanta, Georgia, United States.*

* cited by examiner

Primary Examiner—Matthew D. Anderson
(74) Attorney, Agent, or Firm—Duke W. Yee; Mark E. McBurney; Lisa L. B. Yociss

(57) ABSTRACT

A system, method, and computer program product are disclosed for reducing overhead associated with software lock monitoring in a multiple-processor data processing system having a memory that is shared among the multiple processors. Multiple memory locations in the shared-memory are associated with one of multiple locks. Overhead is reduced by generating a trace hook only in response to activity associated with lock misses.

60 Claims, 4 Drawing Sheets

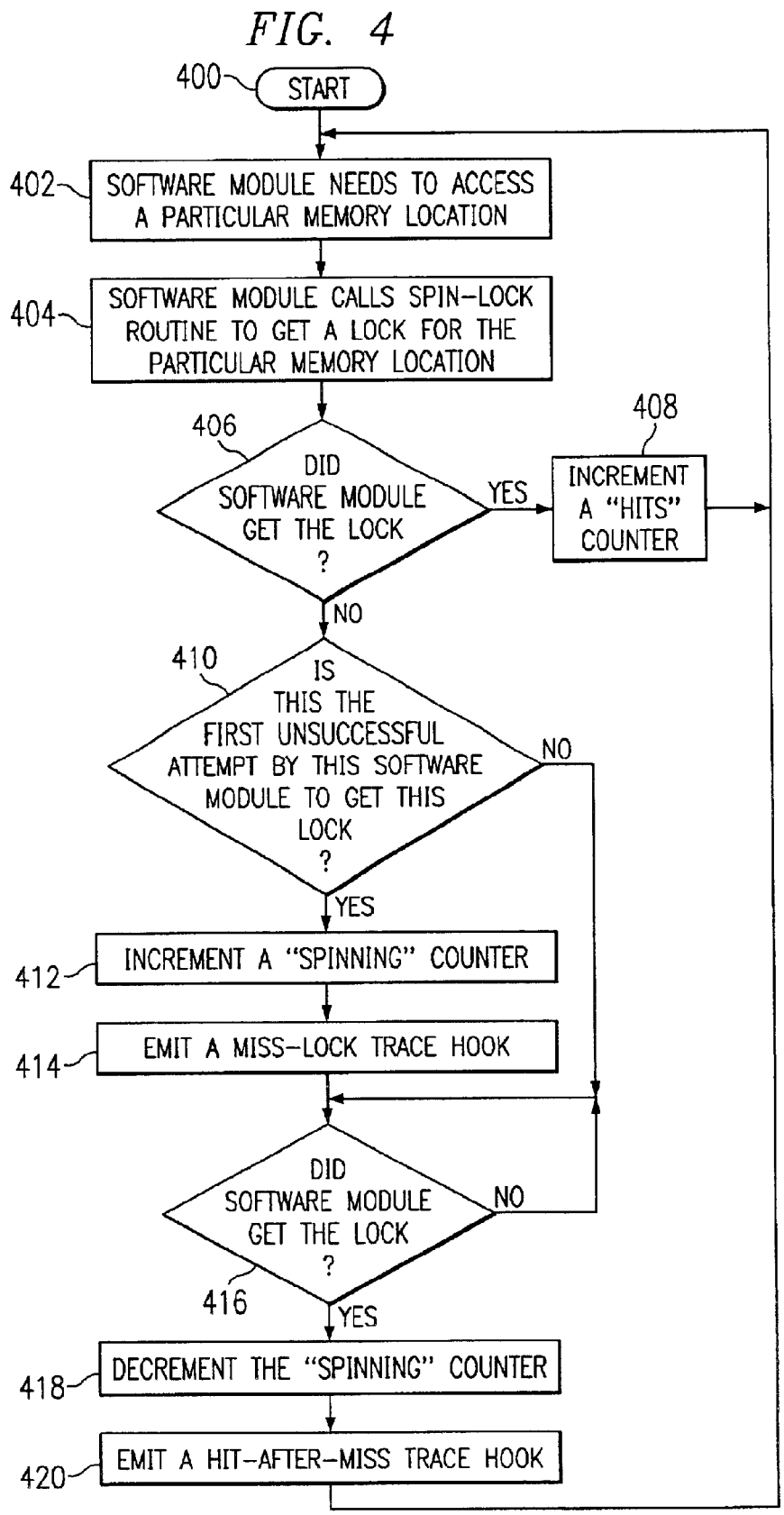

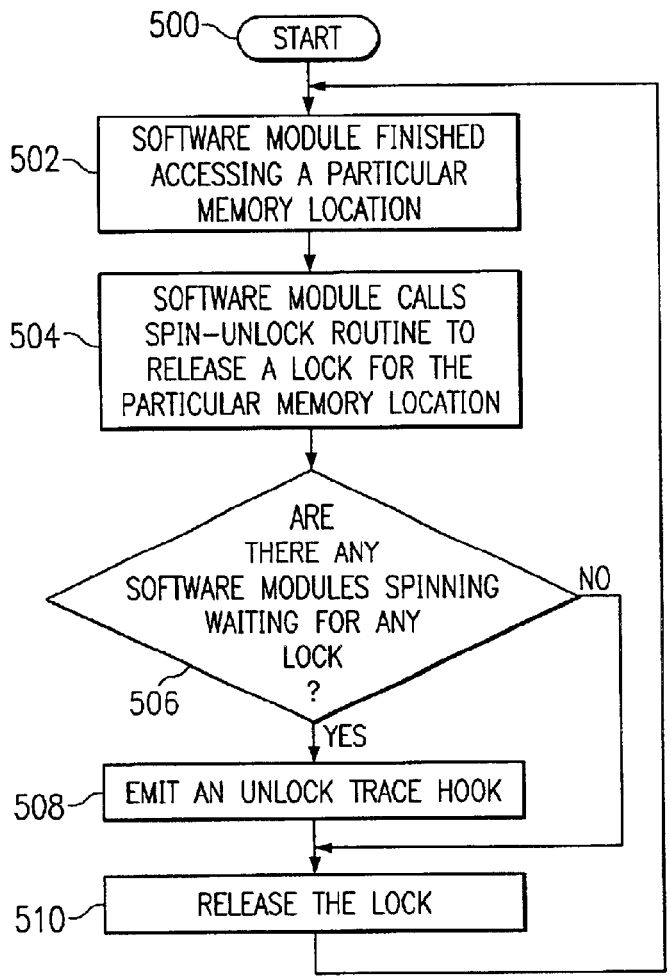
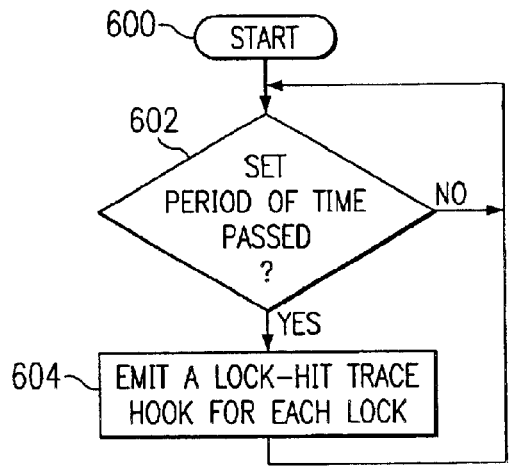

US 6,820,176 B2

SYSTEM, METHOD, AND COMPUTER PROGRAM PRODUCT FOR REDUCING OVERHEAD ASSOCIATED WITH SOFTWARE LOCK MONITORING

BACKGROUND OF THE INVENTION

1. Technical Field

The present invention relates generally to the field of computer systems, and more specifically to a system, method, and computer program product for reducing overhead associated with software lock monitoring in a multiple-processor data processing system having a memory that is shared among the multiple processors.

2. Description of Related Art

A symmetric multiprocessing system (SMP) includes multiple processors that share one or more memory devices. Software routines executing within the multiple processors can access the shared-memory. In order to prevent multiple software routines from simultaneously accessing the same memory location within the shared-memory, SMP systems may implement software locks.

When software locks are utilized, memory locations within the shared-memory are associated with locks. In order for a software routine to access a particular memory location, the software routine must get the lock that is associated with that memory location. A software lock is typically implemented as a bit in a particular memory location. When the lock bit is set to a logical one, a lock has been taken and software routines other than the one having the lock may not access the memory location. When the lock bit is set to a logical zero, a software routine may take the lock. When a software routine takes a lock, the software routine sets the lock bit equal to a logical one. The process of getting a lock is an atomic process such that there are hardware features that guarantee that only one software routine may obtain a lock at a time.

If a first software routine tries to get a lock on a memory location by testing that memory location's lock bit and the lock bit is set, another software routine currently has the lock. When the first software routine is not able to get a lock because another software routine has the lock, it is called "missing" a lock.

If the first software routine missed the lock, the first software routine enters a spinning loop whereby the first software routine continues to test the lock bit until the lock bit is cleared. When the lock bit is cleared, the first software routine may get the lock and thus access the particular memory location.

It is helpful to monitor the activities of the various locks implemented in an SMP system in order to enhance the performance of the SMP system and the applications executing within the system. Effective management and enhancement of data processing systems requires knowing how and when various system resources are being used. Performance tools are used to monitor and examine a data processing system to determine resource consumption as various software applications are executing with the data processing system.

One known software performance tool is a trace tool. A trace tool may use more than one technique to provide trace information that indicates execution flows for an executing program. One technique keeps track of particular sequences of instructions by logging certain events as the occur. When a particular event occurs, a trace hook may be emitted which includes various parameters associated with the particular event.

In an SMP system, substantial system resources are required to fully monitor lock activities. When lock activities are fully monitored, all activity associated with getting or missing a lock is tracked. Data is therefore obtained that is associated with either getting or missing a lock. Thus, the performance of a system that includes full lock monitoring is significantly degraded. Further, when full lock monitoring is implemented in a system, the system does not perform as it would if the lock monitoring were not implemented. The behavior of the system is changed because the implementation of the monitoring produces a sequence of events that would not result without the monitoring.

One solution to the problem has been to build two kernels, one with full lock monitoring for testing purposes and one without any lock monitoring for shipping to customers. Thus, the system shipped to a customer would include a kernel that did not have any lock monitoring. This is problematic, however, because lock monitoring may be needed in a customer environment.

A need exists for a system, method, and computer program product for including lock monitoring functionality in a multiple-processor system while also reducing the overhead associated with the lock monitoring.

SUMMARY OF THE INVENTION

A system, method, and computer program product are disclosed for reducing overhead associated with software lock monitoring in a multiple-processor data processing system having a memory that is shared among the multiple processors. Multiple memory locations in the shared-memory are associated with one of multiple locks. Overhead is reduced by generating a trace hook only in response to activity associated with lock misses.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 illustrates a high level flow chart which depicts software lock monitoring during lock acquisition in accordance with the present invention;

FIG. 5 depicts a high level flow chart which illustrates software lock monitoring during lock release in accordance with the present invention; and FIG. 6 illustrates a high level flow chart which depicts periodic software lock monitoring in accordance with the present invention.

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a system, method, and computer program product for reducing the overhead associated with software lock monitoring in a multiple-processor data processing system having a memory that is shared among the multiple processors. The memory locations in the shared-memory are associated with a lock. When a software routine, or process, needs to access a memory location that has an associated lock, the software routine first must get the associated lock. Overhead is reduced by generating a trace hook only in response to activity associated with lock misses.

A trace hook is emitted for missed locks, lock acquisitions immediately following a lock miss, and for unlock calls when there are calls spinning on a missed lock. Lock miss wait times for each lock are obtained in these trace hooks, as well as information about the calling software routine. A lock hit counter is included that may be emitted as one of the parameters included in a trace hook that is generated when a lock is missed. The lock hit/miss ratio may be determined using the trace hook data and the lock hit counter. When a lock is released, a trace hook is emitted if there are any software routines spinning on any missed locks. This, then, provides the identity of a software routine that had a lock when that lock was missed by another software routine.

In most multiple-processor systems, locks are hit, or acquired, much more often than they are missed. Trace hooks are not generated in the present invention when the lock was hit on a first attempt to get the lock. By not generating trace hooks for first attempt lock hits, the lock trace data rate is reduced, thus reducing overhead.

The present invention provides information about how often a particular lock is taken, and for how long it was held if it is causing other software routines to miss that particular lock. Overall lock hit and miss rates may be determined, as well as per-lock lock miss data and wait times.

Figure 1:
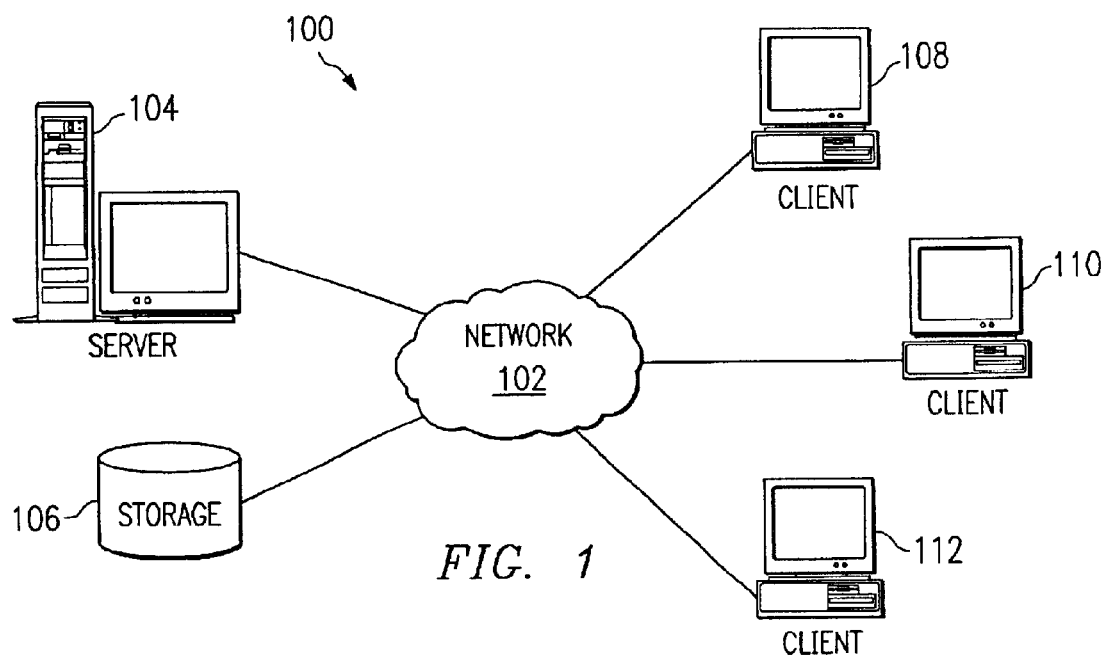
FIG. 1 is a pictorial representation of a distributed data processing system in which the present invention may be implemented in accordance with a preferred embodiment of the present invention.

FIG. 1 is a pictorial representation of a distributed data processing system in which the present invention may be implemented in accordance with a preferred embodiment of the present invention. Network data processing system 10 is a network of computers in which the present invention may be implemented. Network data processing system 10 contains a network 12, which is the medium used to provide communications links between various devices and computers connected together within network data processing system 10. Network 12 may include connections, such as wire, wireless communication links, or fiber optic cables.

In the depicted example, a server 14 is connected to network 12 along with storage unit 16. In addition, clients 18, 20, and 22 also are connected to network 12. Network 12 may include permanent connections, such as wire or fiber optic cables, or temporary connections made through telephone connections. The communications network 12 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 14 without departing from the scope of the present invention. Moreover, as used herein, communications include those enabled by wired or wireless technology.

Clients 18, 20, and 22 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 14 is an SMP system that provides data, such as boot files, operating system images, and applications to clients 18–22. Clients 18, 20, and 22 are clients to server 14. Network data processing system 10 may include additional servers, clients, and other devices not shown. In the depicted example, network data processing system 10 is the Internet with network 12 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 10 also may be implemented as a number of different types of networks, such as for example, an intranet, a local area network (LAN), or a wide area network (WAN). FIG. 1 is intended as an example, and not as an architectural limitation for the present invention.

Figure 2:
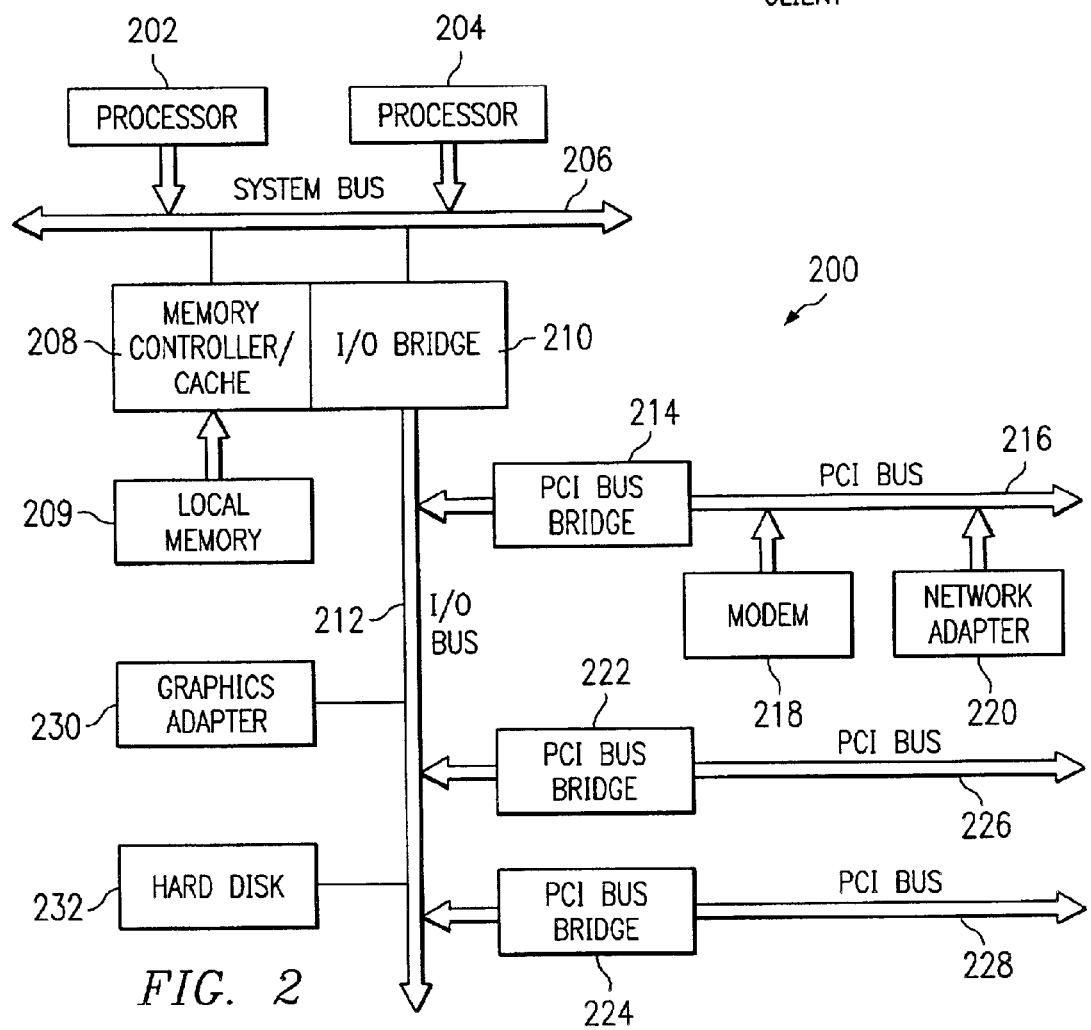
FIG. 2 is a more detailed block diagram of an SMP data processing system which may be implemented as either the server or client computer system depicted by FIG. 1 in accordance with the present invention.

FIG. 2 is a more detailed block diagram of an SMP data processing system which may be implemented as either the server or client computer system depicted by FIG. 1 in accordance with the present invention. Data processing system 200 is a symmetric multiprocessor (SMP) system including a plurality of processors 202 and 204 connected to system bus 206. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
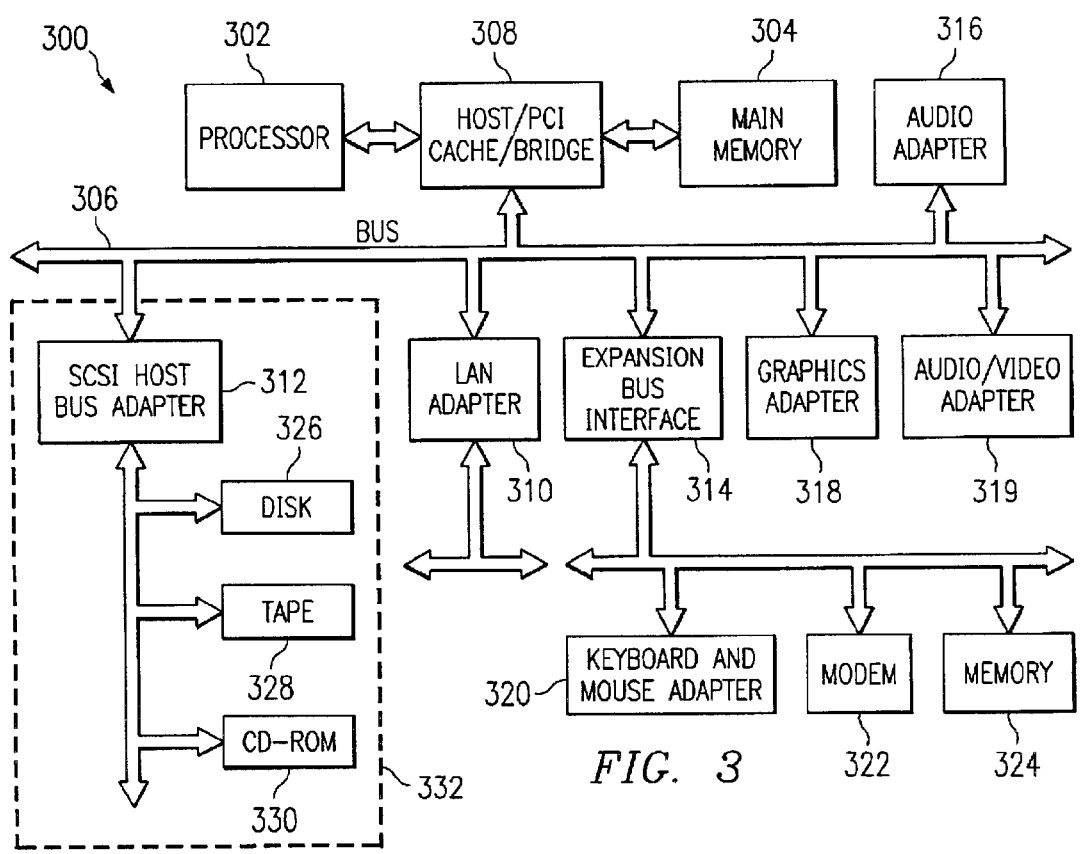
FIG. 3 is a more detailed block diagram of a data processing system which may be implemented as a client computer system depicted by FIG. 1 in accordance with the present invention.

FIG. 3 is a more detailed block diagram of a data processing system which may be implemented as a client computer system depicted by FIG. 1 in accordance with the present invention. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiple-processor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

FIG. 4 illustrates a high level flow chart which depicts software lock monitoring during lock acquisition in accordance with the present invention. The process starts as depicted by block 400 and thereafter passes to block 402 which illustrates a software routine needing to access a particular memory location in an SMP data processing system. Next, block 404 depicts the software routine calling a spin-lock routine to get a lock that is associated with the particular memory location. When a software routine gets a lock, the software routine sets a lock bit associated with the memory location equal to a logical one. When the lock bit is set, no other software routine can access that memory location.

The process then passes to block 406 which illustrates a determination of whether or not the software routine got the particular lock. If a determination is made that the software routine got the particular lock, the process passes to block 408 which depicts incrementing a counter. This counter is identified as a "hits" counter. The "hits" counter keeps track of the number of times a software routine successfully gets a lock on its first attempt. The process then passes back to block 402.

Referring again to block 406, if a determination is made that the software routine did not get the particular lock, the process passes to block 410. Block 410 illustrates a determination of whether or not this attempt to get the lock is the first unsuccessful attempt by this software routine to get this particular lock. If a determination is made that this attempt to get the lock is not the first unsuccessful attempt by this software routine to get this particular lock, the process passes to block 416.

Referring again to block 410, if a determination is made that this attempt to get the lock is the first unsuccessful attempt by this software routine to get this particular lock, the process passes to block 412 which depicts incrementing a counter identified as the "spinning" counter. The "spinning" counter identifies the number of software routines that are currently waiting, i.e. spinning, for a particular lock to be released. The "hits" and "spinning" variables are atomic-type variables.

Next, block 414 illustrates emitting a "miss-lock" trace hook. This "miss-lock" trace hook includes an identification of the particular lock. This identification is preferably the address of the particular lock. The "miss-lock" trace hook also includes the current value of the "hits" counter, the current timestamp, and an identification of the software routine that is trying to get the lock.

Thereafter, block 416 depicts a determination of whether or not the software routine got the lock. If a determination is made that the software routine did not get the lock, the process passes back to block 416. Referring again to block 416, if a determination is made that the software routine did get the lock, the process passes to block 418 which illustrates decrementing the "spinning" counter. The "spinning" counter is decremented because this software routine is no longer spinning. Next, block 420 depicts emitting a "hit-after-miss" trace hook. The "hit-after-miss" trace hook includes an identification of the particular lock, an identification of the software routine that got the lock, and the current timestamp. The process then passes back to block 402.

The following pseudo-code is an example of one method for implementing the process of FIG. 4.

```
static atomic-type variables hits, spinning;
    spinlock(lock)
{
int first = 1;
while (try_lock_fails(lock))
    if (first)
    {
    atomic_inc(&spinning);
    LOCK_MISS_TRACE_HOOK(lock,caller,hits,
    timestamp);
    first = 0;
    }
```

```
    if(!first)
        {
        atomic_dec(&spinning);
        LOCK_HIT_TRACE_HOOK(lock,caller,timestamp);
        }
    else
        {
        atomic_inc(&hits);
        //Lock hit trace hooks could also be emitted here
periodically.
        }
    }
```

FIG. 5 depicts a high level flow chart which illustrates software lock monitoring during lock release in accordance with the present invention. The process starts as depicted by block 500 and thereafter passes to block 502 which depicts a software routine finishing accessing a particular memory location that has associated with it a particular lock. Next, block 504 illustrates the software routine calling a spin-unlock routine in order to release the particular software lock associated with the particular memory location.

The process then passes to block 506 which depicts a determination of whether or not there are any software routines spinning, waiting, for any lock. If a determination is made that no software location is spinning for a lock, the process passes to block 510. Referring again to block 506, if a determination is made that there is at least one software routine spinning, waiting, for at least one lock, the process passes to block 508 which illustrates emitting an "unlock" trace hook. The "unlock" trace hook includes an identification of the particular lock that is being released by the software routine and an identification of the software routine that is releasing the particular lock. Thereafter, block 510 depicts the software routine releasing the particular lock by setting the lock bit to a logical zero. The process then passes back to block 502.

The following pseudo-code is an example of one method for implementing the process of FIG. 5.

```
    spin_unlock(lock)
    {
    if(spinning)
        UNLOCK_TRACE_HOOK(lock,caller);
    unlock(lock)
    }
```

FIG. 6 illustrates a high level flow chart which depicts periodic software lock monitoring in accordance with the present invention. The process starts as illustrated by block 600 and thereafter passes to block 602 which depicts a determination of whether or not a particular period of time has passed. If a determination is made that a particular period of time has not passed, the process passes back to block 602. If a determination is made that a particular period of time has passed, the process passes to block 604 which illustrates emitting a "lock-hit" trace hook for each lock. The "lock-hit" trace hook includes an identification of a particular lock, the current timestamp, the software routine that got the lock, and may include other information. This trace hook may be occasionally emitted if additional information about lock activity is desired. If this trace hook is emitted very frequently, however, the system will begin to suffer from the problems described by the prior art. The process then passes back to block 602.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for reducing overhead associated with software lock monitoring in a multiple-processor data processing system having a memory that is shared among the multiple processors, said method comprising the steps of:

associating a plurality of memory locations in said shared-memory with one of a plurality of software locks; and generating a trace hook only in response to activity associated with lock misses, whereby overhead associated with software lock monitoring is reduced.

2. The method according to claim 1, further comprising the steps of:

executing an attempt by a software routine to get a particular one of said plurality of locks;

determining whether said attempt was successful; and in response to a determination that said attempt was successful, incrementing a first counter, said first counter indicating a quantity of times a software routine successfully acquired any one of said plurality of locks on a first attempt to acquire said any one of said plurality of locks.

3. The method according to claim 1, further comprising the steps of:

executing an attempt by a software routine to get a particular one of said plurality of locks;

determining whether said attempt was successful;

in response to a determination that said attempt was not successful, determining whether said attempt was a first attempt by said software routine to get said particular one of said plurality of locks; and in response to a determination that said attempt was a first attempt, incrementing a second counter, said second counter indicating a quantity of software routines currently waiting for any one of said plurality of locks to become available to be acquired.

4. The method according to claim 3, further comprising the step of emitting a trace hook that includes an identity of said software routine.

5. The method according to claim 3, further comprising the step of emitting a trace hook that includes an identity of said particular one of said plurality of locks.

6. The method according to claim 3, further comprising the step of emitting a trace hook that includes a time stamp that identifies a time when said attempt occurred.

7. The method according to claim 3, further comprising the steps of:
maintaining a first counter that indicates a quantity of times a software routine successfully acquired any one of said plurality of locks on a first attempt to acquire said any one of said plurality of locks; and
emitting a trace hook that includes a current value of said first counter.

8. The method according to claim 3, further comprising the steps of:
executing subsequent attempts by said software routine to get said particular one of said plurality of locks; and
in response to a subsequent attempt by said software routine to get said particular one of said plurality of locks being successful, decrementing said second counter.

9. The method according to claim 8, further comprising the step of emitting a trace hook, said trace hook including an identity of said software routine.

10. The method according to claim 8, further comprising the step of emitting a trace hook that includes an identity of said particular one of said plurality of locks.

11. The method according to claim 8, further comprising the step of emitting a trace hook that includes a time stamp that identifies a time when said subsequent successful attempt occurred.

12. The method according to claim 3, further comprising the steps of:
in response to a determination that said attempt was not a first attempt, executing subsequent attempts by said software routine to get said particular one of said plurality of locks; and
in response to a subsequent attempt by said soft ware routine to get said particular one of said plurality of locks being successful, decrementing said second counter.

13. The method according to claim 12, further comprising the step of emitting a trace hook, said trace hook including an identity of said software routine.

14. The method according to claim 12, further comprising the step of emitting a trace hook that includes an identity of said particular one of said plurality of locks.

15. The method according to claim 12, further comprising the step of emitting a trace hook that includes a time stamp that identifies a time when said subsequent successful attempt occurred.

16. A data processing system for reducing overhead associated with software lock monitoring in a multiple-processor data processing system having a memory that is shared among the multiple processors, said system comprising:
means for associating a plurality of memory locations in said shared-memory with one of a plurality of software locks; and
means for generating a trace hook only in response to activity associated with lock misses, whereby overhead associated with software lock monitoring is reduced.

17. The system according to claim 16, further comprising:
means for executing an attempt by a software routine to get a particular one of said plurality of locks;
means for determining whether said attempt was successful; and
means responsive to a determination that said attempt was successful, for incrementing a first counter, said first counter indicating a quantity of times a software routine successfully acquired any one of said plurality of locks on a first attempt to acquire said any one of said plurality of locks.

18. The system according to claim 16, further comprising:
means for executing an attempt by a software routine to get a particular one of said plurality of locks;
means for determining whether said attempt was successful;
means responsive to a determination that said attempt was not successful, for determining whether said attempt was a first attempt by said software routine to get said particular one of said plurality of locks; and
means responsive to a determination that said attempt was a first attempt, for incrementing a second counter, said second counter indicating a quantity of software routines currently waiting for any one of said plurality of locks to become available to be acquired.

19. The system according to claim 18, further comprising means for emitting a trace hook that includes an identity of said software routine.

20. The system according to claim 18, further comprising means for emitting a trace hook that includes an identity of said particular one of said plurality of locks.

21. The system according to claim 18, further comprising means for emitting a trace hook that includes a time stamp that identifies a time when said attempt occurred.

22. The system according to claim 18, further comprising:
means for maintaining a first counter that indicates a quantity of times a software routine successfully acquired any one of said plurality of locks on a first attempt to acquire said any one of said plurality of locks; and
means for emitting a trace hook that includes a current value of said first counter.

23. The system according to claim 18, further comprising:
means for executing subsequent attempts by said software routine to get said particular one of said plurality of locks; and
means responsive to a subsequent attempt by said software routine to get said particular one of said plurality of locks being successful, for decrementing said second counter.

24. The system according to claim 23, further comprising means for emitting a trace hook, said trace hook including an identity of said software routine.

25. The system according to claim 23, further comprising means for emitting a trace hook that includes an identity of said particular one of said plurality of locks.

26. The system according to claim 23, further comprising means for emitting a trace hook that includes a time stamp that identifies a time when said subsequent successful attempt occurred.

27. The system according to claim 18, further comprising:
means responsive to a determination that said attempt was not a first attempt, for executing subsequent attempts by said software routine to get said particular one of said plurality of locks; and
means responsive to a subsequent attempt by said software routine to get said particular one of said plurality of locks being successful, for decrementing said second counter.

28. The system according to claim 27, further comprising means for emitting a trace hook, said trace hook including an identity of said software routine.

29. The system according to claim 27, further comprising means for emitting a trace hook that includes an identity of said particular one of said plurality of locks.

30. The system according to claim 27, further comprising means for emitting a trace hook that includes a time stamp that identifies a time when said subsequent successful attempt occurred.

31. A computer program product in a data processing system for reducing overhead associated with software lock monitoring in a multiple-processor data processing system having a memory that is shared among the multiple processors, said computer program product comprising:
   instruction means for associating a plurality of memory locations in said shared-memory with one of a plurality of software locks; and
   instruction means for generating a trace hook only in response to activity associated with lock misses, whereby overhead associated with software lock monitoring is reduced.

32. The product according to claim 31, further comprising:
   instruction means for executing an attempt by a software routine to get a particular one of said plurality of locks;
   instruction means for determining whether said attempt was successful; and
   instruction means responsive to a determination that said attempt was successful, for incrementing a first counter, said first counter indicating a quantity of times a software routine successfully acquired any one of said plurality of locks on a first attempt to acquire said any one of said plurality of locks.

33. The product according to claim 31, further comprising:
   instruction means for executing an attempt by a software routine to get a particular one of said plurality of locks;
   instruction means for determining whether said attempt was successful;
   instruction means for responsive to a determination that said attempt was not successful, for determining whether said attempt was a first attempt by said software routine to get said particular one of said plurality of locks; and
   instruction means for responsive to a determination that said attempt was a first attempt, for incrementing a second counter, said second counter indicating a quantity of software routines currently waiting for any one of said plurality of locks to become available to be acquired.

34. The product according to claim 33, further comprising instruction means for emitting a trace hook that includes an identity of said software routine.

35. The product according to claim 33, further comprising instruction means for emitting a trace hook that includes an identity of said particular one of said plurality of locks.

36. The product according to claim 33, further comprising instruction means for emitting a trace hook that includes a time stamp that identifies a time when said attempt occurred.

37. The product according to claim 33, further comprising:
   instruction means for maintaining a first counter that indicates a quantity of times a software routine successfully acquired any one of said plurality of locks on a first attempt to acquire said any one of said plurality of locks; and
   instruction means for emitting a trace hook that includes a current value of said first counter.

38. The product according to claim 33, further comprising:
   instruction means for executing subsequent attempts by said software routine to get said particular one of said plurality of locks; and
   instruction means for responsive to a subsequent attempt by said software routine to get said particular one of said plurality of locks being successful, for decrementing said second counter.

39. The product according to claim 38, further comprising instruction means for emitting a trace hook, said trace hook including an identity of said software routine.

40. The product according to claim 38, further comprising instruction means for emitting a trace hook that includes an identity of said particular one of said plurality of locks.

41. The product according to claim 38, further comprising instruction means for emitting a trace hook that includes a time stamp that identifies a time when said subsequent successful attempt occurred.

42. The product according to claim 33, further comprising:
   instruction means for responsive to a determination that said attempt was not a first attempt, for executing subsequent attempts by said software routine to get said particular one of said plurality of locks; and
   instruction means for responsive to a subsequent attempt by said software routine to get said particular one of said plurality of locks being successful, for decrementing said second counter.

43. The product according to claim 42, further comprising instruction means for emitting a trace hook, said trace hook including an identity of said software routine.

44. The product according to claim 42, further comprising instruction means for emitting a trace hook that includes an identity of said particular one of said plurality of locks.

45. The product according to claim 42, further comprising instruction means for emitting a trace hook that includes a time stamp that identifies a time when said subsequent successful attempt occurred.

46. A data processing system for reducing overhead associated with software lock monitoring in a multiple-processor data processing system having a memory that is shared among the multiple processors, said system comprising:
   a plurality of memory locations in said shared-memory, said plurality of memory locations being associated with one of a plurality of software locks; and
   a device that generates a trace hook only in response to activity associated with lock misses, whereby overhead associated with software lock monitoring is reduced.

47. The system according to claim 46, further comprising:
   a software routine that executes an attempt to get a particular one of said plurality of locks;
   said software routine for determining whether said attempt was successful; and
   in response to a determination that said attempt was successful, a first counter being incremented, said first counter indicating a quantity of times a software routine successfully acquired any one of said plurality of locks on a first attempt to acquire said any one of said plurality of locks.

48. The system according to claim 46, further comprising:
   a software routine executing an attempt to get a particular one of said plurality of locks;
   said software routine for determining whether said attempt was successful;
   in response to a determination that said attempt was not successful, said device for determining whether said attempt was a first attempt by said software routine to get said particular one of said plurality of locks; and
   in response to a determination that said attempt was a first attempt, a second counter being incremented, said second counter indicating a quantity of software routines currently waiting for any one of said plurality of locks to become available to be acquired.

49. The system according to claim 48, further comprising said device for emitting a trace hook that includes an identity of said software routine.

50. The system according to claim 48, further comprising said device for emitting a trace hook that includes an identity of said particular one of said plurality of locks.

51. The system according to claim 48, further comprising said device for emitting a trace hook that includes a time stamp that identifies a time when said attempt occurred.

52. The system according to claim 48, further comprising:
- a first counter that indicates a quantity of times a software routine successfully acquired any one of said plurality of locks on a first attempt to acquire said any one of said plurality of locks; and
- said device for emitting a trace hook that includes a current value of said first counter.

53. The system according to claim 48, further comprising:
- said software routine executing subsequent attempts to get said particular one of said plurality of locks; and
- in response to a subsequent attempt by said software routine to get said particular one of said plurality of locks being successful, said second counter being decremented.

54. The system according to claim 53, further comprising said device for emitting a trace hook, said trace hook including an identity of said software routine.

55. The system according to claim 53, further comprising said device for emitting a trace hook that includes an identity of said particular one of said plurality of locks.

56. The system according to claim 53, further comprising said device for emitting a trace hook that includes a time stamp that identifies a time when said subsequent successful attempt occurred.

57. The system according to claim 48, further comprising:
- in response to a determination that said attempt was not a first attempt, said software routine for executing subsequent attempts to get said particular one of said plurality of locks; and
- in response to a subsequent attempt by said software routine to get said particular one of said plurality of locks being successful, said second counter being decrementing.

58. The system according to claim 57, further comprising said device for emitting a trace hook, said trace hook including an identity of said software routine.

59. The system according to claim 57, further comprising said device for emitting a trace hook that includes an identity of said particular one of said plurality of locks.

60. The system according to claim 57, further comprising said device for emitting a trace hook that includes a time stamp that identifies a time when said subsequent successful attempt occurred.

* * * * *

UNITED STATES PATENT AND TRADEMARK OFFICE
CERTIFICATE OF CORRECTION

PATENT NO. : 6,820,176 B2
DATED : November 16, 2004
INVENTOR(S) : Heisch

It is certified that error appears in the above-identified patent and that said Letters Patent is hereby corrected as shown below:

<u>Column 9,</u>
Line 36, after "said" delete "soft ware" and insert -- software --.

Signed and Sealed this

Thirty-first Day of January, 2006

JON W. DUDAS
*Director of the United States Patent and Trademark Office*